(12) United States Patent  (10) Patent No.: US 6,470,501 B1
Han  (45) Date of Patent: Oct. 29, 2002

(54) AUTOMATIC INCINERATOR OF HUMAN BODY'S EXCREMENT APPLICABLE TO TOILET

(76) Inventor: Kab-Young Han, 521-10 Mok-dong, Yangchun-gu, Seoul 135-080 (KR)

( * ) Notice: Subject to any disclaimer, the term of this patent is extended or adjusted under 35 U.S.C. 154(b) by 0 days.

(21) Appl. No.: 09/959,025
(22) PCT Filed: Apr. 7, 2000
(86) PCT No.: PCT/KR00/00318
§ 371 (c)(1),
(2), (4) Date: Oct. 15, 2001
(87) PCT Pub. No.: WO00/63126
PCT Pub. Date: Oct. 26, 2000

(30) Foreign Application Priority Data

Apr. 15, 1999 (KR) .......................................... 99-13428

(51) Int. Cl.[7] .............................................. A47K 11/02
(52) U.S. Cl. ...................................... 4/111.5; 4/111.1
(58) Field of Search .............................. 4/111.1, 111.2, 4/111.3, 111.4, 111.5

(56) References Cited

U.S. PATENT DOCUMENTS

| 3,436,765 A | * | 4/1969 | Sundberg | 4/111.5 |
| 3,943,579 A | | 3/1976 | Blankenship | 4/111.5 |
| 4,148,103 A | * | 4/1979 | Nishioka | 4/111.1 |
| 5,924,141 A | * | 7/1999 | Fransson | 4/111.1 |

FOREIGN PATENT DOCUMENTS

| JP | 5236837 | * | 3/1977 | 4/111.2 |
| SU | 1639623 | * | 4/1991 | 4/111.1 |

* cited by examiner

Primary Examiner—Robert M. Fetsuga

(57) ABSTRACT

In the automatic incinerator of the human body's excrement having a given function, which is installed within a toilet stool of a restroom and in which excrement of the human body drops into an incinerating oven thereof and collected, and simultaneously, is automatically burned up by using an incineration processing device with a simple construction sanitarily, in an earlier time, without specific septic facilities, to thereby prevent an environment from being polluted and curtail several kinds of incidental expenses required for a septic process, the automatic incinerator comprises a plural number of incinerating ovens having calorific units, which are radially installed on a rotating unit; a power generating part set in a center of a support frame and intermittently rotated in response to an applying signal from the outside; a cover ascending and descending by an elevating unit in an upper part of the incinerating ovens so as to open or closely seal up the incinerating oven; a rotary member provided as an impeller, connected to the power generating part of the outside and installed piercing through a center part of the cover, so as to be rotated in a lower part of the cover, a suction/exhaust part provided by a pipe-connection between an injection nozzle and a discharge tube; and a dust collecting part extended to one end of a flexible tube of the discharge tube, for collecting several kinds of gas generated in the incinerating ovens.

9 Claims, 5 Drawing Sheets

[Fig. 1]
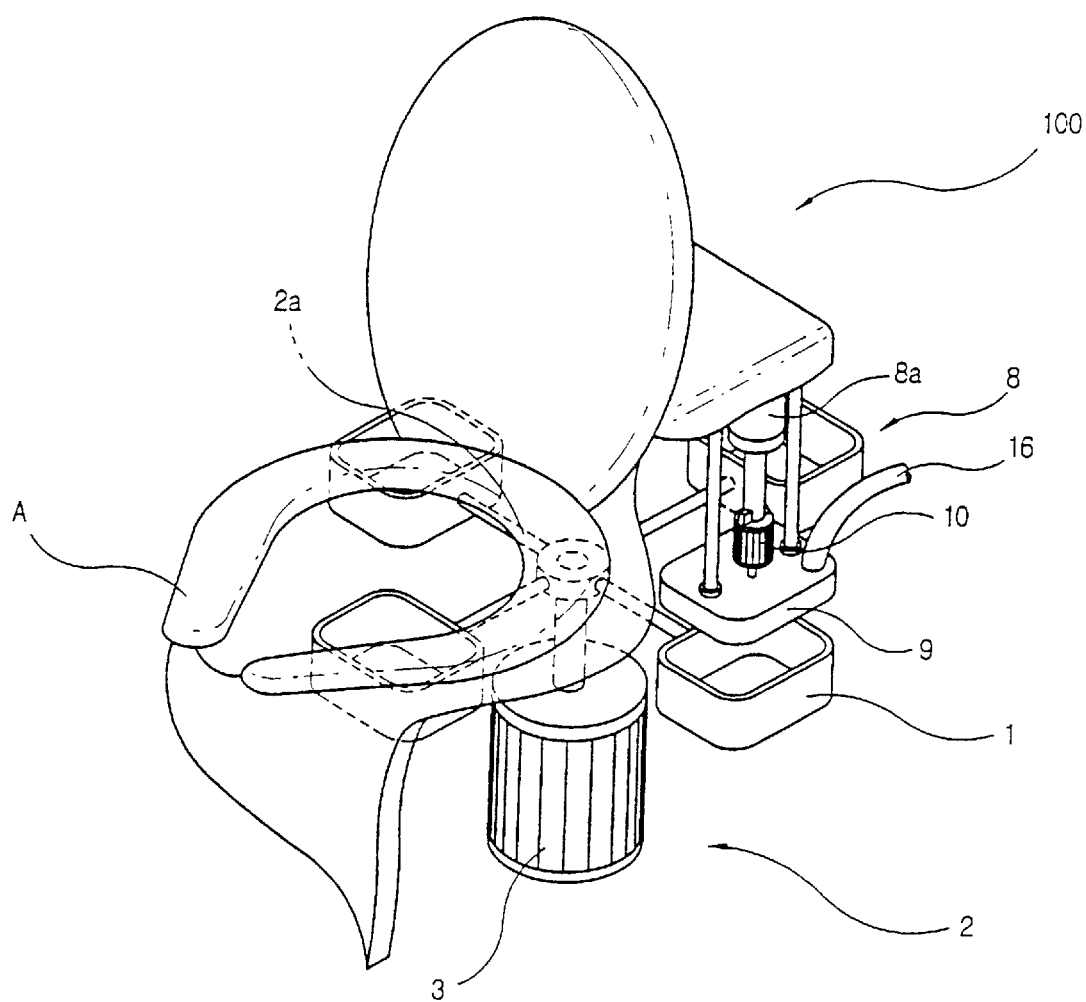

[Fig. 2]
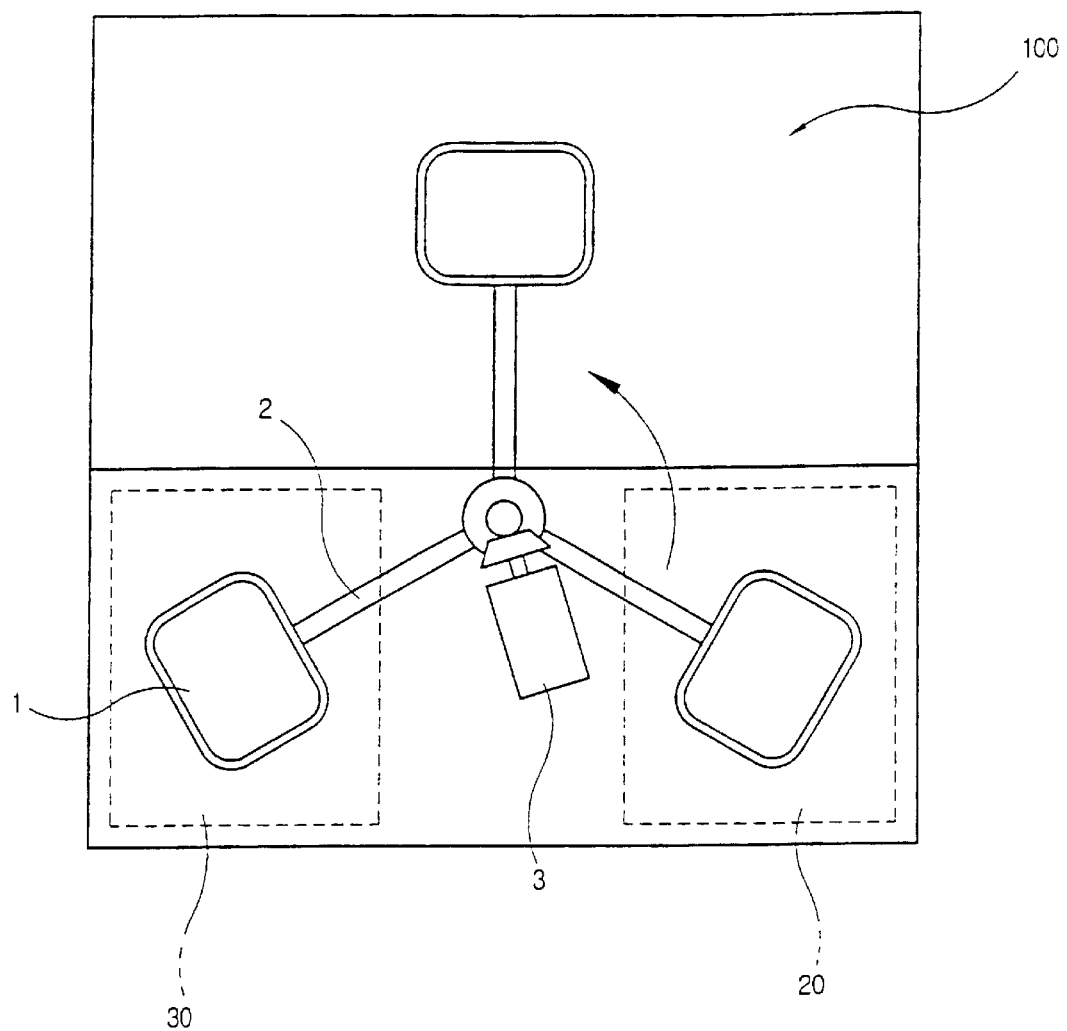

【Fig. 3a】
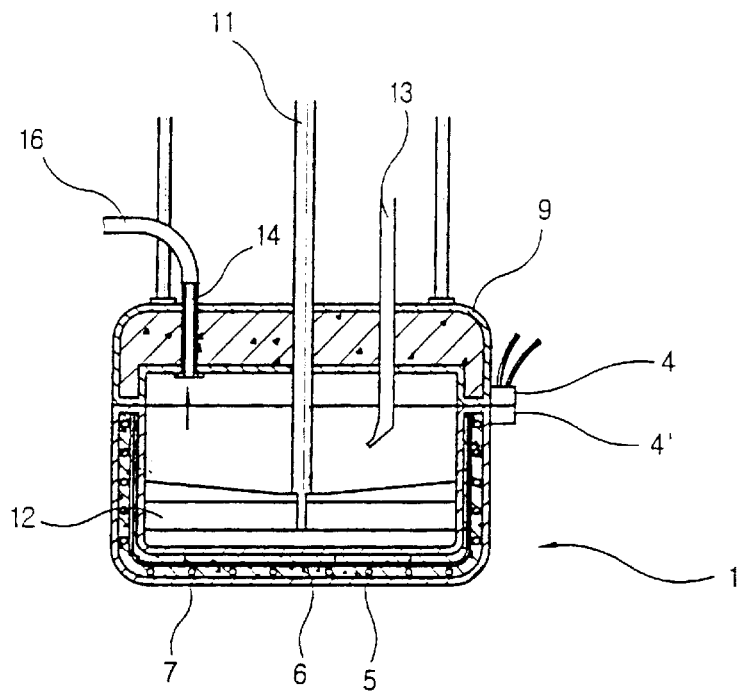
【Fig. 3b】
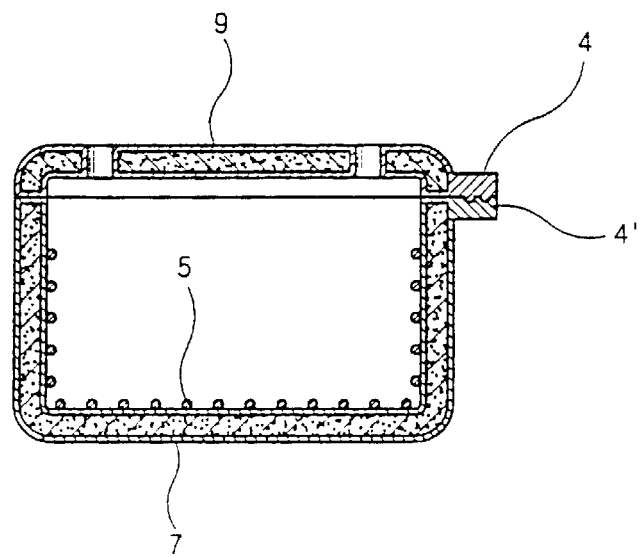

[Fig. 4]
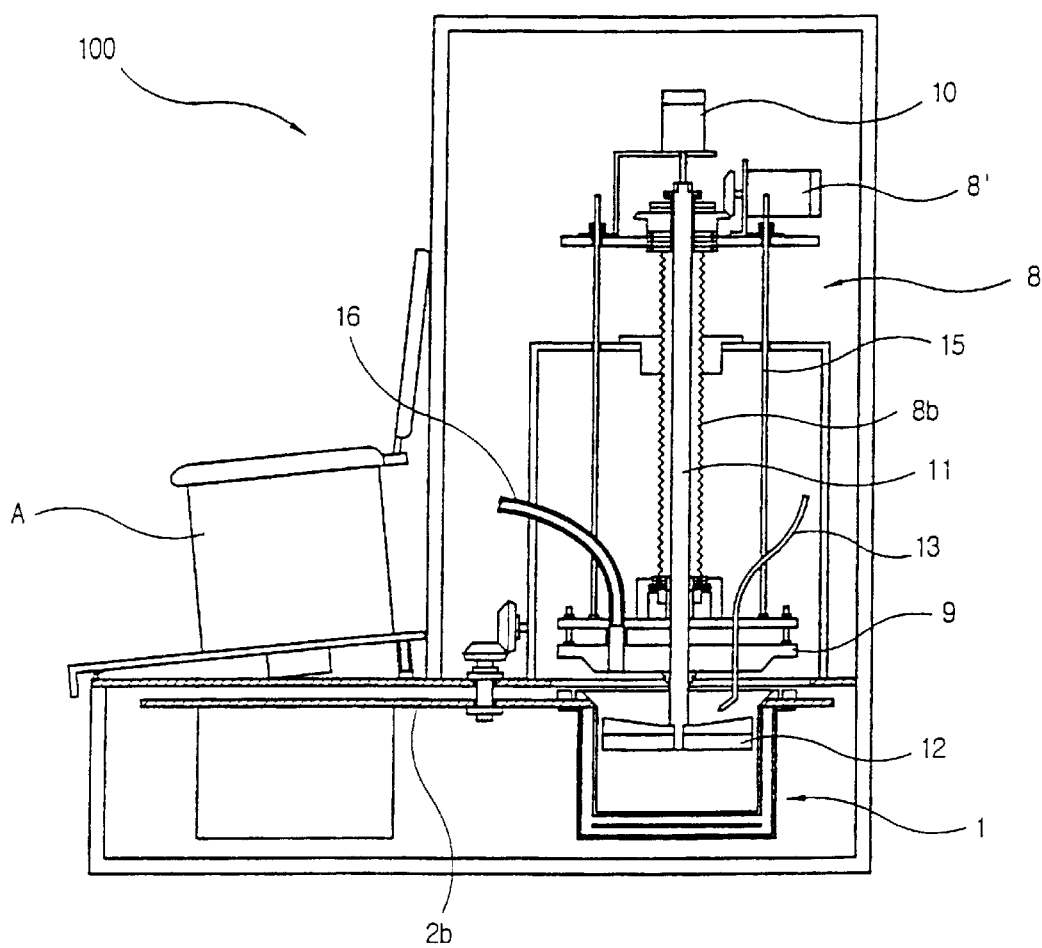

[Fig. 5]
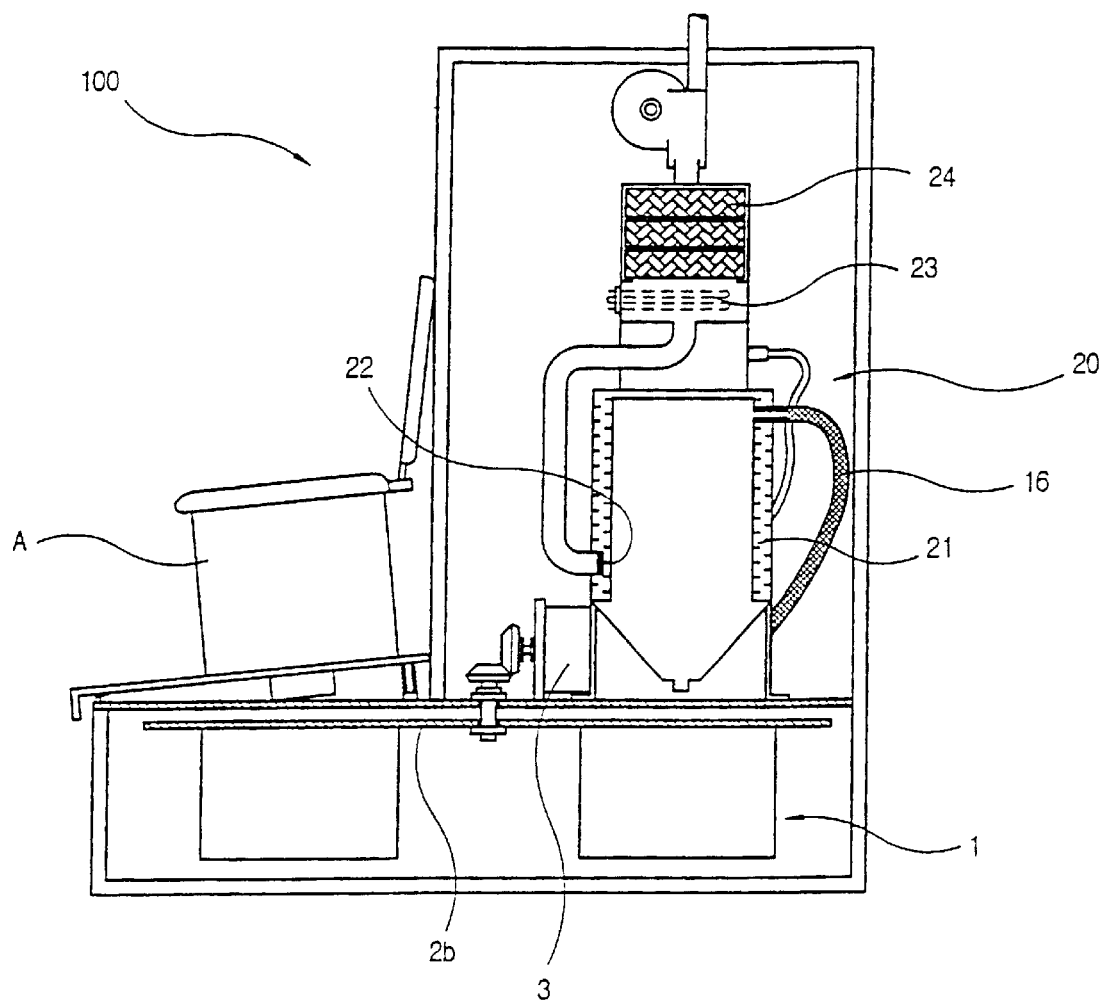

AUTOMATIC INCINERATOR OF HUMAN BODY'S EXCREMENT APPLICABLE TO TOILET

TECHNICAL FIELD

The present invention relates to an automatic incinerator of the human body's excrement; and, more particularly, to an automatic incinerator having an improved function, which is applicable to a toilet and is installed within a toilet stool, and in which the excrement of the human body falls into an incinerating oven of the incinerator then collected thereinto, simultaneously, is automatically burned up by using an incineration processing device based on a simple construction, sanitarily, in a rapid time without specific septic facilities, to thereby prevent an environmental pollution and curtail several incidental expenses.

BACKGROUND ART

In processing the human body's excrement, in general the excrement discharged from a toilet is put into a septic tank and has the procedures of a decay for a constant time, a precipitation and a filtration within the septic tank. Then its filtered water is sewage-treated as it is, after that, its solid is removed by an adsorption device etc. within the septic tank.

However, such septic processing system can not achieve a perfect decomposition and filtration for the excrement, in other words, it causes several kinds of germs contained in the filtered water, further brings about not only the river contamination but also the polluted water as a source for people's drinking water, by a discharge of the filtered water containing the germs, which seriously influences upon people's health.

Furthermore, solid leftovers remained for the precipitation and filtering procedures in the septic tank should be separately withdrawn as above-mentioned, thus its removal working is very inconvenient together with an occurrence of excessive offensive odor. Also it accompanies a difficulty in selecting a storage position of the excrement and undesirable problems in respect of a city environment.

Furthermore, sealing water of a constant quantity used for restraining an ill-smelling diffusion is always maintained within a toilet stool, which may cause a sanitary problem as the bong water is spattered to stain the skin of a user in using the toilet stool. Detergent is needed specifically since an effective prevention from the ill-smelling does not function well, or lavatory tissue dropped within the toilet stool dumps sometimes, which makes a sewage stopped up, etc.

Excessive facilities expenses in equipping the sanitation facilities is also burdened together with excessive waste of water.

Therefore, "Automatic Incinerating Device for Toilet" was proposed by the present applicant in Korean Patent Registration No. 63386.

In constructive characteristic of this invention, a circular shape belt having a formation of a toothed wheel is installed on a rotary gear connected to a driving motor, and on its upper face, numerous incinerating ovens combined with a center part of a prop which is bendable, are set. An inner face of the incinerating oven is covered with an insulation layer and is additionally covered on an internal girth thereof with a stone plate layer having an insulation heater installed thereinside, and on one side of an upper face thereof, a contact sensor adheres, and a contact sensor is also installed on one side of a lower face of a cover which is positioned on an upper part of the incinerating oven. In its interior face, further, a stone plate layer having another insulation layer and electric heater set therein is installed. For a combination with this stone plate layer, this is connected to a cylinder which is insertion-processed in both movable shafts provided on one side face thereof so as to be moved upward and downward and is fixed. In an interval space between an interior face of such cover and the insulation layer, a specific volume sensor is set, and on its lower face, a suction tub is installed in one body with the cover in a lower face of the stone plate layer, and herewith, a flexible tube is inserted thereinto, to be thereby connected to an inlet pipe of a water tub set in a lower face thereof In a lower face of this water tub a discharge pipe having a specific opening/closing valve is connected to a drain, and in a lower right side of the circular shape belt, a combustion product receiving plate is set, and in its front part a sponge layer inserted into the rotary motor is connected with a piston of a cylinder and a rotary motor. In a front face part of the circular shape belt, a bendable transparent pasteboard is inserted by an up/down movable motor into a bendable frame having a guiding concave flute formed in an inner side thereof so as to cover the incinerating oven of an upper face. Such construction has advantages, meantime, a reduction and collection of remnants through a separate incineration and a complete incineration of excretion as discharge matter is imperfect. Therefore, "Automatic Incinerating Device for Toilet" is improved, applied for and published in Korean Utility Model Publication No. 96-3623 in Apr. 27, 1996 by the present applicant.

However, the construction in such respective prior technical spirit has a relatively long length by installing the belt on a track operating like a conveyor belt, and by fixing the plurality of incinerating ovens to an upper part of the belt then setting it in an inner lower part of a toilet stool, and also has a relatively overall wide installment area by installing a power generating unit provided as a driving unit on a side face thereof, together with a requirement for a big engineering work in a neighboring structure of the toilet, and further needs a specific cleaning work of the incinerating oven after a use. That is, it makes the device complicated and required for an additional process, and earnestly needs to develop an incinerating device based on an improved function and to be able to compensate for some shortage since there is no any consideration for an instrumental device to promote combustion according to an incineration.

DISCLOSURE OF THE INVENTION

It is, therefore, a primary object of the invention to provide an automatic incinerator of the human body's excrement applicable to a toilet, in which excrement of the human body can be processed sanitarily, rapidly, with the minimization of an installable area, an instrumental simplification, an effective catching of gas generated, simultaneously without a specific cleaning work, and also with promoting a combustion in performing an incineration.

In accordance with the present invention for achieving the above object, the automatic incinerator comprises a plural number of incinerating ovens having calorific units, the incinerating ovens being installed in a rotating unit, with a maintenance of a mutually symmetric horizontal position; a power generating part set in a center of the rotating unit and intermittently rotated in response to an applying signal from the outside; a cover ascending and descending by an elevating unit in an upper part of the incinerating ovens so as to open or closely seal up the incinerating oven; a rotary member provided as an impeller, connected to the power generating part of the outside and installed piercing throuah a center part of the cover, so as to be rotated in a lower part of the cover; a suction/exhaust part provded by a pipe-connection between an injection nozzle and a discharge tube, and a dust collecting part extended to one end of a flexible tube of the discharge tube, for collecting several kinds of gas generated in the incinerating oven.

BRIEF DESCRIPTION OF THE DRAWINGS

The above and other objects and features of the instant invention will become apparent from the following description of preferred embodiments taken in conjunction with the accompanying drawings, in which:

FIG. 1 represents a partially cut perspective view of a toilet stool in accordance with the present invention;

FIG. 2 indicates a plane explanatory view of a rotary type oven in the present invention;

FIGS. 3a and 3b offer sectional explanatory views of an incinerating oven in the invention, FIG. 4 illustrates an overall sectional explanatory view of an incinerating part in the invention; and FIG. 5 depicts an overall sectional explanatory view of a dust collecting part in the invention.

BEST MODE FOR CARRYING OUT THE INVENTION

Reference will now be made in detail to the preferred embodiments of the present invention, examples of which are illustrated in the accompanying drawings.

In accordance with the present invention, as shown in an installing status view of FIG. 1, an excrement incinerating device 100 is set within a toilet stool A of a restroom so as to provide a neat visuality and minimize a refusal feeling in its installment.

This incinerating device 100 is previously set in a corresponding position of the toilet stool A when the toilet stool A is installed in the restroom. The incinerating device 100 is largely divided into an incinerating part 30 having an incinerating oven 1 for properly receiving excrement of the human body and incinerating it and a sealing cover 9; and a dust collecting part 20 for discharging and collecting incinerated ash, namely, remnants.

FIG. 2 shows the incinerating oven installed horizontally, and this incinerating oven is provided by the plural number, maintaining a radial position installed, that is, it is preferably required for three support frames based on a Y shape but it is not surely limited to such requirement, in other words, it is available to embody the invention by a rotary unit 2 such as a turntable 2b, etc.

Such each incinerating oven 1 is fixed onto an upper part of the support frame 2a based on the Y shape, and on a center portion of the support frame 2a, a stepping motor 3 intermittently rotatable in response to an applying signal from the outside is set up.

FIG. 3a is an enlarged sectional view for one embodiment of the incinerating oven 1 part.

The incinerating oven 1 maintains a capacity enough to be filled with all excrement and urine of the human body, has an electric fever line 5 installed on its internal section so as to emit heat by high temperature then perform a given heating function according to an operation of a contact switch 4 set on one side of the outside thereof and operating by an earth state with the cover 9, and is supported by ceramic as lagging material. The incinerating oven 1 also has an adhesion of a synthetic resin panel 6 for a short prevention of the electric fever line 5 on its internal circumference face, or is provided by applying a complete insulation process on the electric fever line 5 itself then by processing it to be exposed within the oven 1 like another embodiment of the invention shown in FIG. 3b, and is further provided with its external circumference face wrapped with thermal insulating cover 7 in order for thermal insulation.

On a straightly upper part of the incinerating oven 1, the cover 9 is provided to open or closely seal up the incinerating oven 1 by an ascending or descending movement of the cover by a constant distance by using an elevating unit 8 provided as a specific cylinder part 8a or a screw 8b etc. Herewith, another contact switch 4' having a mutually symmetrical shape to be confronted with and adhere with the contact switch 4 is installed on one side thereof, and the rest material construction and combination except the electric fever line 5 are same as the incinerating oven 1.

Further, it is provided a rotary member 11 of a pipe body shape connected to a motor 10 as a specific power generating part and projected downward piercing through a centering part of the cover 9. The rotary member 11 is provided with an impeller 12 of a diameter shape installed on an end part thereof, the impeller 11 being set to be near to an inner circumference face of the incinerating oven 1. Separately from that, a suction/exhaust part provided as an injection nozzle 13 and a discharge tube 14 is offered by a pipe-connection thereto to arrange a specific external air supplying device so that air is strengthily ejected to an internal space part of the incinerating oven 1 thereby its external exhaust is executed through the discharge tube 14 and the exhausted incineration gas is filtered and discharged by the dust collecting part 20 to be mentioned later.

In addition, in order to maintain a definition in an ascending and descending movement of the cover 9 and its smooth movement, a plurality of guide rods 15 are installed on the right and left both sides of the cover 9 upper part. An accurateness in the combination with the incinerating oven 1 is also gained by elevating the cover 9 through a use of the elevating unit 8 provided as the screw 8b by the air cylinder 8a or a motor 8'.

Such constructive cover 9 is provided with the discharge tube 14 formed on one side thereof, and the discharge tube 14 is also provided with a flexible tube 16 extended toward the outside and its one end part is connected to the dust collecting part 20, the flexible tube 16 having a prominent elasticity.

When an operation of the electric fever line 5 heating for a given time by an operation of the contact switch 4,4' is completed, a terminal of the contact switch 4,4' is shorted and simultaneously an injection operation and its stopping operation can be gotten by its sensor signal.

The dust collecting part 20 is constructed with a silo dust collector 21, a dust filter 22, a heater 23 and catalyst 24, so as to enough collect several kinds of gas into the end part of the flexible tube 16 extended thereto, the gas being generated in the incinerating oven 1.

In the above inventive construction, the incinerating oven 1 of an opened shape is positioned in a lower part of the toilet stool A provided in an initial state and is offered in a stand-by state, then when a user sits on a seat plate of the toilet stool A in the restroom, relieves him/herself and leaves therefrom, a specific sensor operates then the stepping motor 3 operates, to move the incinerating oven 1 put with the excretion to a position where the cover 9 is installed.

According to that, the incinerating oven 1 intermittently rotates toward a next position predetermined and then another incinerating oven 1 positioned on its one side is moved to a lower part of the toilet stool A to arrange a stand-by state.

Herewith, it may be also required a slant guiding path formed in an interior lower part of the toilet stool A, so that the excretion can be dropped as it is, into the incinerating oven 1 when the user relieves him/herself on the toilet stool A.

As shown in FIG. 4 the cover 9 fixedly standing by is closely combined with an upper part of the incinerating oven 1 moved to the next position, through a downward movement of the cover 9 along the guide rods 15 positioned on the right and left upper part thereof, wherein the incinerating oven 1 moved to the next position is shown in FIGS. 1 and 2. Accordingly, an ill-smelling generating an be prevented and at the same time the excretion thereinside is completely incinerated by an operation of the contact switches 4,4' then a heating emit of the electric fever line 5 at a high temperature, after that, the cover 9 can be opened, At this time, in order to smooth its incineration, the impeller 12 connected to the upper motor 10 operates to constantly stir and scatter the excretion through a function of stirring the excrement at a constant speed, and air from the outside inflows properly through the injection nozzle 13 during the excretion's incineration and is injected thereinto to thereby promote combustion according to its incineration.

At the same time when such incineration working is completed, a specific blast motor operates to inject air of a high pressure then strengthily discharge the incinerated ash through the discharge tube 14 without any remnants so as not to need for a separate cleaning work. Hazardous gas such as methane gas etc. generated in the incineration process or previously is caught, passing through the silo dust collector 21, the dust filter 22, the heater 23 and the catalyst 24 of the dust collecting part 20, and is sanitarily processed even with a catching of smell.

INDUSTRIAL APPLICABILITY

Accordingly, in accordance with the present invention, an incinerating oven rotary system based on a horizontal type is employed to obtain a minimized space occupied in equipping the facilities and a simplification of facilities together with an effective gas catching and a shortening in processing time by executing simultaneously or in turn an incineration and stir of excrement and a discharge of incineration ash, further without a separate cleaning work by always maintaining an incinerating oven interior in a clean state.

That is, the invention has advantages in respect of the environmental protection and the sanitary process for the human body's excrement by achieving cheap installment expenses and a simple operating system.

Although the invention has been shown and described with respect to the preferred embodiments, it will be understood by those skilled in the art that various changes and modifications may be made without departing from the spirit and scope of the invention as defined in the following claims.

What is claimed is:

1. An automatic incinerator of human body's excrement applicable to a toilet, comprising:

a plurality of incinerating ovens having a heating unit and being radially installed in a rotating unit;

a power generating part set in a center of a support frame and intermittently rotated in response to an applying signal from the outside;

a cover ascending and descending by an up/down elevating unit in an upper part of the incinerating ovens so as to open or closely seal up the incinerating ovens;

a rotary member as an impeller rotated in a lower part of the cover, said rotary member being connected to the power generating part of the outside and installed piercing through a center part of the cover;

a suction/exhaust part provided by a pipe-connection between an injection nozzle and a discharge tube; and a dust collecting part extended to one end of a flexible tube of the discharge tube, for collecting several kinds of gas generated in the incinerating oven.

2. The incinerator of claim 1, wherein said heating unit of the incinerating oven is formed by closely covering an electric fever line with ceramic material, fixing a synthetic resin panel onto an inner circumference face thereof, and covering an outer circumference face thereof with a thermal insulating cover.

3. The incinerator of claim 2, wherein said electric fever lines are sealing-processed and arrayed, exposed in the inner circumference face of the incinerating oven.

4. The incinerator of claim 2 or 3, wherein said incinerating oven is provided with a contact switch formed on one side of the exterior thereof, said contact switch earth-operating with the cover.

5. The incinerator of claim 1, wherein said rotating unit of the incinerating oven is constructed by the support frame formed radially.

6. The incinerator of claim 1, wherein said rotating unit of the incinerating oven is constructed by a turn-table of a circular plate shape.

7. The incinerator of claim 1, wherein said up/down elevating unit of the incinerating oven cover is provided by a forward and backward appearing and disappearing of a cylinder.

8. The incinerator of claim 1, wherein said up/down elevating unit of the incinerating oven cover is provided by a rotation of a screw combined with a motor.

9. The incinerator of claim 1, wherein said dust collecting part is constructed by combining a silo dust collector, a dust filter, a heater and catalyst with one another.

* * * * *